(12) United States Patent
Shasha

(10) Patent No.: US 9,507,734 B2
(45) Date of Patent: Nov. 29, 2016

(54) CORRUPTING DATA STRUCTURES FOR PRIVACY PROTECTION

(71) Applicant: New York University, New York, NY (US)

(72) Inventor: Dennis Shasha, New York, NY (US)

(73) Assignee: New York University, New York, NY (US)

( * ) Notice: Subject to any disclaimer, the term of this patent is extended or adjusted under 35 U.S.C. 154(b) by 98 days.

(21) Appl. No.: 14/469,254

(22) Filed: Aug. 26, 2014

(65) Prior Publication Data

US 2015/0067288 A1    Mar. 5, 2015

Related U.S. Application Data

(60) Provisional application No. 61/872,464, filed on Aug. 30, 2013.

(51) Int. Cl.
*G06F 12/00*  (2006.01)
*G06F 12/14*  (2006.01)

(52) U.S. Cl.
CPC ....... *G06F 12/1425* (2013.01); *G06F 12/1408* (2013.01); *G06F 2212/402* (2013.01)

(58) Field of Classification Search
CPC ........... G06F 12/1425; G06F 12/1408; G06F 2212/402
See application file for complete search history.

(56) References Cited

U.S. PATENT DOCUMENTS

| | | | |
|---|---|---|---|
| 7,694,151 B1 * | 4/2010 | Johnson | G06F 12/1416 709/213 |
| 2008/0144095 A1 * | 6/2008 | Suzuki | H04L 61/1535 358/1.15 |

\* cited by examiner

*Primary Examiner* — Shawn X Gu
(74) *Attorney, Agent, or Firm* — Foley & Lardner LLP

(57) ABSTRACT

Methods, systems, and apparatuses, including computer programs encoded on computer-readable media, for storing data in both defaultable and non-defaultable memory on a unit in such a way that if a pluggable device is removed from the unit, the defaultable memory is reset to some default state. Further, non-defaultable memory may have data, but that data is unintelligible without data in the defaultable memory.

18 Claims, 4 Drawing Sheets

Generate seed s_b using time, biometrics etc.

Use shrinking generator based on s_b to generate a block-sized bit pad P.

Form exclusive OR of bit pad P with block b. Yield b_corrupted.

Now, b_corrupted can go in non-defaultable memory. Association identifier of b, s_b remains in defaultable memory.

Generate seed s_b using time, biometrics etc.

Use shrinking generator based on s_b to generate a block-sized bit pad P.

Form exclusive OR of bit pad P with block b. Yield b_corrupted.

Now, b_corrupted can go in non-defaultable memory. Association identifier of b, s_b remains in defaultable memory.

CORRUPTING DATA STRUCTURES FOR PRIVACY PROTECTION

CROSS REFERENCE TO RELATED APPLICATIONS

This application claims priority to U.S. Provisional Application No. 61/872,464 filed Aug. 30, 2013, reference of which is incorporated herein in its entirety.

BACKGROUND OF THE INVENTION

The loss of confidential information costs enterprises billions of dollars per year, can affect their competitiveness, and can even change the balance of power. A frequent mechanism for loss consists of viruses that steal data from disk and flash storage in computers and then send that data to third parties. It is therefore of interest to render any such information meaningless when legitimate users are not accessing it.

SUMMARY OF THE INVENTION

One implementation relates to a system for protecting data. The system includes a unit containing a connection port for a pluggable device and containing both defaultable and non-defaultable memory. A pluggable device is further included and a source of data which may be different from the pluggable device. The defaultable memory is reset to default values when the pluggable device is removed.

Another implementation relates to a device for engaging a unit with a connection port for protecting data when an authorized user is not using it comprising: defaultable and non-defaultable memory. A device connection port is engageable with the unit connection port; wherein defaultable memory is reset to default values when the pluggable device is removed.

Another implementation relates to a method of protecting data utilizing defaultable memory and nondefaultable memory. A seed is generated. The seed is stored in the defaultable memory. A block of data is corrupted wherein the seed is the key to uncorrupt the data. The corrupted block of date is stored in nondefaultable memory.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE PREFERRED EMBODIMENTS

Figure 1:
FIG. 1 illustrates flow chart for a method of corrupting data.
Figure 1:
Figure 1:

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are systems and methods for securing data. In general, one aspect of the subject matter described in this specification can be embodied in a product that consists of one or more client units where each such unit has storage which is characterized as partly "defaultable" and partly "non-defaultable". In one implementation, the unit includes one or more of a physical or a wireless port and a removable device which is either physically or wirelessly connected to that device. Such a device is referred to herein as a pluggable device (even though, in the wireless case, the device is not literally plugged in. Examples include a pluggable device such as a flash memory device, a wireless device that communicates over a secure channel with the unit. In one implementation, a mobile phone is the removable device for interaction with payment kiosks, such as through NFC, where the user's credit card information, for example, is protected by corruption and wherein the seed is on the phone.

Defaultable memory in as described herein is memory that will be reset to some default values (for example all 0s) when the pluggable device is removed from physical connection, physical proximity, or wireless connection to the unit. By contrast, there is no guarantee that the contents of non-defaultable memory will change to their default values when the pluggable device is removed (so any information left in the clear on non-defaultable memory could be read by an adversary). In addition there may be an external data source such as a database which may be held on the pluggable device or on at least one separate device.

In one implementation, the unit is a mobile phone, such as a smart phone, and the removable device is a configured as a key fob or the like. The key fob includes the seed to uncorrupt certain data on the smart phone, such as sensitive personal data, financial data, or the like. The key fob and smart phone may be in communication by one or more wireless protocols. Alternatively, or in addition, the key fob may be structured to engage a port on the mobile phone, such as a mini-HDMI, mini-usb, micro USB, etc. It should be appreciated that such provides an additional level of security against data breach when a mobile phone is lost as one would need the key fob to also access that data.

The at least one pluggable device may be a device that is either physically connected to the unit or has a preferably secure wireless connection to a unit. Unplugging such a device means to break the connection (either physical or wireless respectively). In one embodiment, one or more of the pluggable device and/or the unit may include software or hardware to disconnect the unit and pluggable device after a predetermined period of time or period of inactivity.

In one implementation, the device may be used to secure internet or intranet access. In such an implementation, a portion of the operating system, program, or a file necessary for network access is corrupted. The computer or other electronic device may only access the network when the device (having the seed) is present.

Figure 2:
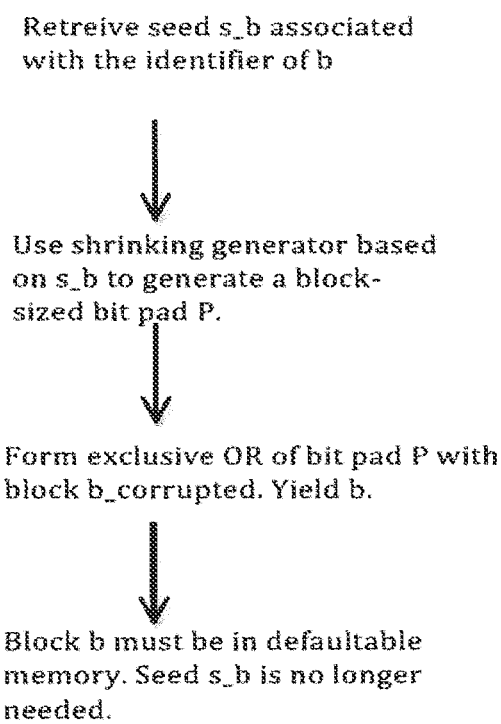
FIG. 2 illustrates a flow chart for a method of uncorrupting data.
Figure 3:
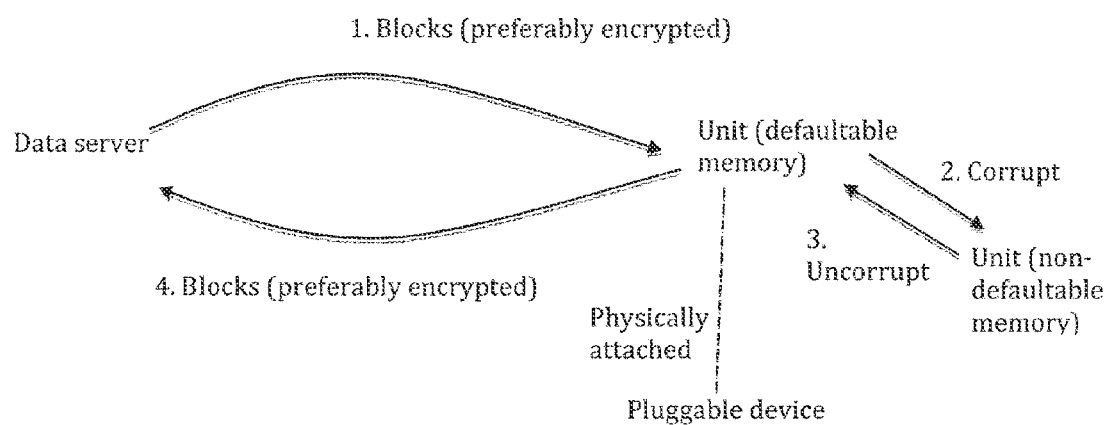
FIG. 3 illustrates one implementation of operation.

FIG. 1 illustrates a method of corrupting data. In the illustrated implementation, a random seed generates a block-sized sequence of bits P. P is exclusive ored with b to form b_corrupted. The identifier of b (e.g. its memory address) and the random seed can be used to reconstruct b. FIG. 2 illustrates a method of uncorrupting data. In the illustrated implementation uncorrupting reverses the process of corrupting using only the stored random seed in defaultable memory. FIG. 3 illustrates one implementation of operation where the unit receives (1) and sends (4) blocks to the data server and keeps some blocks in defaultable memory and other blocks in corrupted form in non-defaultable memory (2 and 3). If the pluggable device becomes unplugged, the defaultable memory is reset to its default state, rendering the corrupted blocks in the non-defaultable memory unintelligible.

In operation, when the pluggable device is attached (either physically or by wireless connection), in response to user requests, the unit accesses data from this external data source, preferably by some secure means such as encryption, and operates on it in defaultable memory if enough such memory is available. If there is more data needed than will fit in defaultable memory, data is put in blocks in non-defaultable memory in a "corrupted" manner.

Corruption of a block b works as follows: based on a seed s_b, a pseudo-random bit string is created of the size of block b. That bit string is exclusive-ored with block b to yield a "corrupted" block, b_corrupted. The corrupted block b_corrupted is stored in non-defaultable memory but the seed s_b is stored in defaultable memory and is associated with the identifier of b.

Suppose a block b is needed in uncorrupted form, but b is only in non-defaultable memory in corrupted form, b_corrupted. To obtain b in uncorrupted form, the pseudo-random bit string corresponding to b is generated based on the seed s_b associated with b. (In the preferred embodiment, each corrupted block has a different seed, but this is not required.) The resulting pseudo-random bit string is exclusive-ored with b_corrupted to obtain b (in uncorrupted form). This operation is called de-corruption.

When the pluggable device is removed, the unit changes the memory locations corresponding to defaultable memory to their default values. This includes the seeds corresponding to the corrupted blocks. Effectively, this erases the seed values, rendering the corrupted blocks in non-defaultable memory unintelligible.

In the preferred embodiment, defaultable memory could be a portion of volatile main memory that will contain the seed data structure as well as memory space for uncorrupted blocks. A daemon process could check for the presence of the pluggable device. If it finds that device to be absent, then the daemon could reset the defaultable memory to its default state. The advantage of using volatile memory is that power loss would be another way to return the defaultable memory to its default state.

Also in the preferred embodiment, the pseudo-random bits are generated from a linear shift register or a combination of linear shift registers (as in a shrinking generator). The random seeds may depend on some state of the system, the time in microseconds and perhaps even some ephemeral biometric test on the user (such as the times the user takes between successive letters when typing a well-known sentence such as "the cow jumped over the moon").

In one embodiment, this invention occurs within the general context of one or more units that access a shared encrypted database held on an untrusted shared storage device. Unit accesses to that database occur using the database operations of a normal database engine such as MySQL, SQLServer, or Oracle. The unit must decrypt data blocks that are returned to it. Those decrypted data blocks are held in either defaultable or non-defaultable memory as described above.

Figure 4:
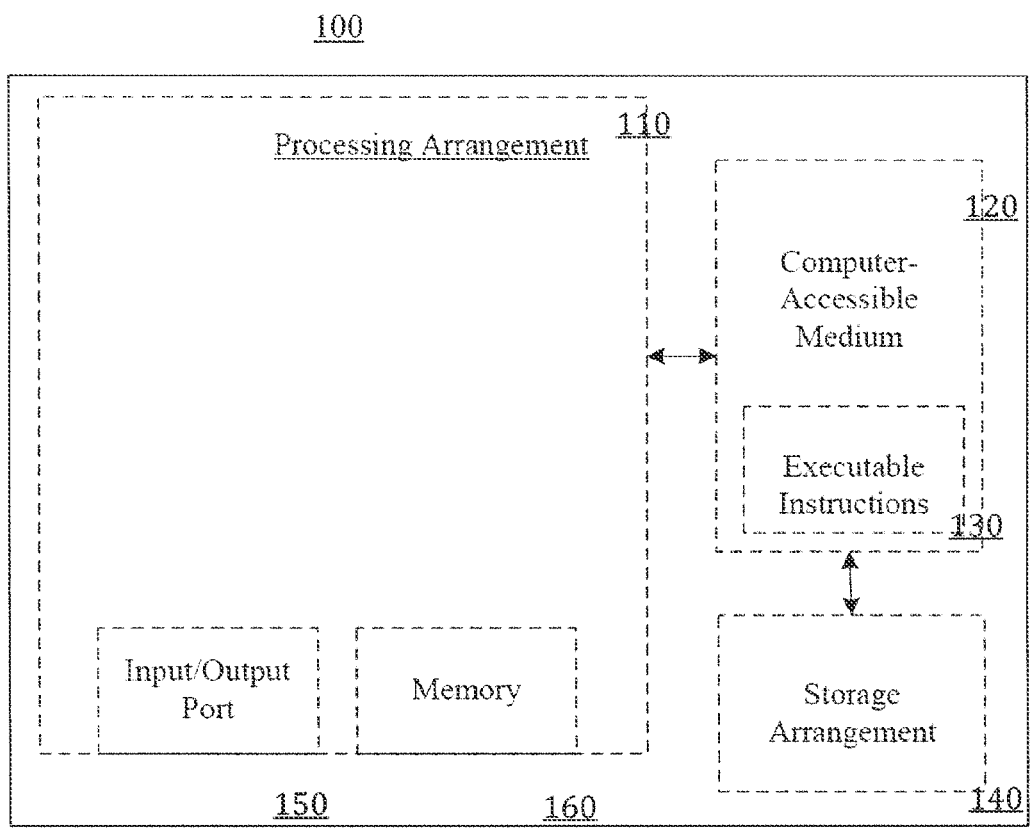
FIG. 4 illustrates a computer system for use with certain implementations.

One implementation may utilize a computer system, such as shown in FIG. 4, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a keyboard, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A system for protecting data comprising:
   a unit containing a connection port for a pluggable device and containing both defaultable and non-defaultable memory,
   the non-defaultable memory having only corrupted blocks stored therein;
   the defaultable memory having seeds and their associated block identifiers stored therein
   a pluggable device,
   a source of data which may be different from the pluggable device,
   wherein defaultable memory is reset to default values when the pluggable device is removed and wherein non-defaultable memory may not reset to default values when the pluggable device is removed.

2. The system of claim 1 wherein no two blocks share the same seed.

3. The system of claim 1 wherein different blocks may share the same seed.

4. The system of claim 1 wherein the seeds depend on at least one of time, system configuration, and biometric information.

5. A device for engaging a unit with a connection port for protecting data when an authorized user is not using it comprising:
   defaultable and non-defaultable memory,
   a device connection port engageable with the connection port;
   the non-defaultable memory having only corrupted blocks stored therein;
   the defaultable memory having seeds and their associated block identifiers stored therein, each seed associated one or more of the corrupted blocks;
   wherein defaultable memory is reset to default values when the device is removed and the non-defaultable memory may not be reset to default values when the device is removed.

6. The device of claim 5 wherein no two blocks share the same seed.

7. The device of claim 5 wherein different blocks may share the same seed.

8. The device of claim 5 wherein the seeds depend on at least one of time, system configuration, and biometric information.

9. A method of protecting data utilizing defaultable memory and non-defaultable memory comprising:
   generating a seed;
   storing the seed in the defaultable memory;
   corrupting a block of data wherein the seed is a key to uncorrupt the data; and
   storing the corrupted block of data in non-defaultable memory wherein defaultable memory is reset to default values when the defaultable memory is removed from a connection port and wherein non-defaultable memory may not reset to default when removed from the connection port.

10. The method of claim 9 wherein only corrupted blocks are stored in non-defaultable memory.

11. The method of claim 10 wherein blocks are corrupted by generating pseudo-random sequences from random seeds and exclusive-oring an uncorrupted block with a pseudo-random bit sequence.

12. The method of claim 10 wherein the random seeds and their associated block identifiers are stored in defaultable memory.

13. The method of claim 12 wherein no two blocks share the same seed.

14. The method of claim 12 wherein different blocks may share the same seed.

15. The method of claim 11 further comprising generating the pseudo-random sequences by at least one linear shift register from the generated seed.

16. The method of claim 11 wherein the generated seed depends on at least one of time, system configuration, and biometric information.

17. The method of claim 9 further comprising corrupting a block given a seed.

18. The method of claim 9 further comprising de-corrupting a block given an associated seed.

* * * * *